Oct. 9, 1962  F. R. OFNER  3,057,076
RECOVERY SYSTEM
Filed May 26, 1958  2 Sheets-Sheet 1

INVENTOR.
FRANK R. OFNER
BY
JOHN W. GRAHAM
ATTORNEY

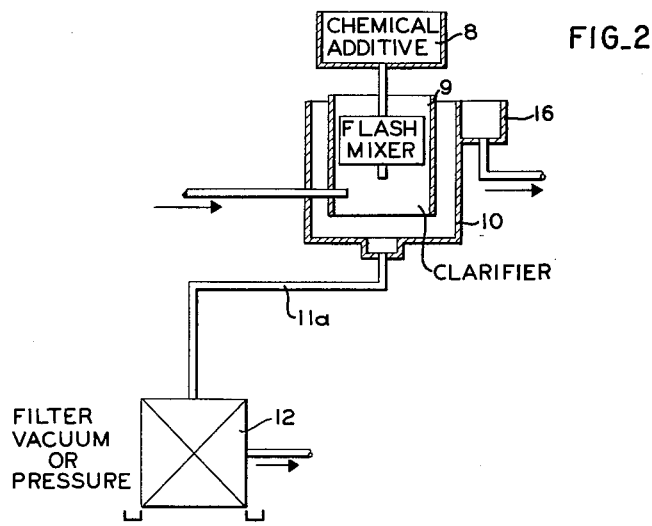
FIG_2
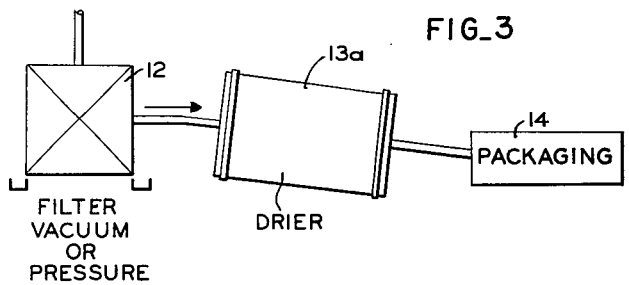
FIG_3
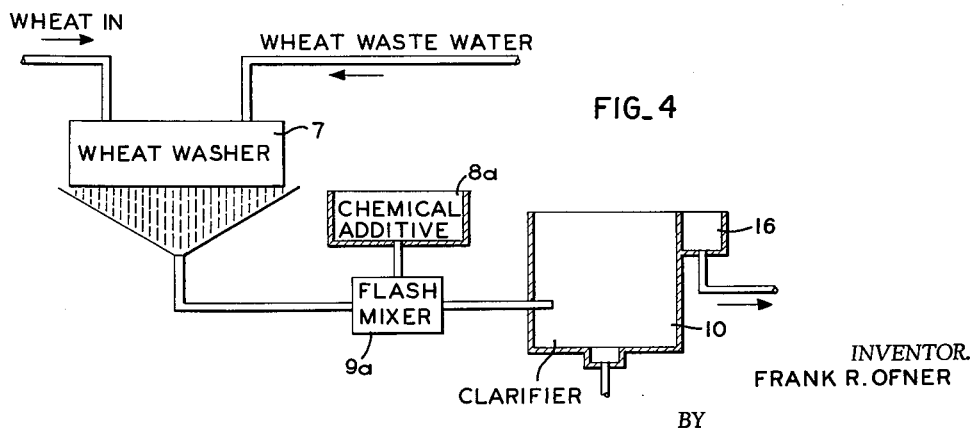
FIG_4
INVENTOR.
FRANK R. OFNER
BY
JOHN W. GRAHAM
ATTORNEY

United States Patent Office 3,057,076
Patented Oct. 9, 1962

3,057,076
RECOVERY SYSTEM
Frank R. Ofner, Portland, Oreg., assignor, by mesne assignments, to Industrial Powertronix, Inc., Portland, Oreg., a corporation of Oregon
Filed May 26, 1958, Ser. No. 737,728
2 Claims. (Cl. 34—12)

This invention relates to the separation of food solids from a liquid containing the same therein as, for example, flour mill waste solids from flour mill wash water, and more particularly to a process for both the recovery of a solids nutrient from the wastes of flour mills and the recovery of the wash water after a partial separation of solids therefrom.

This application is a continuation-in-part of my co-pending patent applications, Serial No. 325,773, and Serial No. 382,806, filed, respectively, December 13, 1952 and September 28, 1953; now Patent Nos. 2,835,985 and 2,835,984. In these prior applications, the problem of recovering flour mill wastes was considered, and a solution presented for recovering both of the primary materials comprising such wastes—namely, wheat solids and wash water. While the present invention represents an improvement thereover, it is believed to be both helpful and convenient to set forth herein the general environmental conditions for the development.

In a large percentage of flour mills, the wheat used in preparing flour is cleaned prior to milling it into flour, by a washing process. In the process of washing, the wheat is subjected to a water bath and, inadvertently, a large quantity of broken, cracked and whole wheat is carried away with the waste wash water. Since a minimum amount of water is used in the washing process as an economy measure, a relatively large concentration of wheat solids is present in the waste wash water.

Generally, the washing of the wheat grain takes place prior to the grain's being hulled and the whole grain with the hulls thereon is dumped into a water stream and carried thereby into a centrifugal separator that ordinarily consists of a rotating hollow cylinder having a plurality of apertures along the outer surface through which the broken and cracked grain as well as some of the hulls are carried. The grain products that will later be hulled and milled into flour are carried onwardly by the stream of water through the center of the rotating cylinder. The waste solids that are forced through the apertures in the rotating tank have at this point a paste-like consistency with a water content of about 60% to 75%.

These waste solids have heretofore been disposed of as valueless and have been carried away from the centrifugal separator, after being discharged therefrom, by a stream of water that usually empties into a waste disposal system. The waste solids are, however, high in food value since, excluding the actual wheat seed itself, they include the wheat heart which contains about 22% protein and 8% fat, and the hulls which are about 12% protein and 3½% fat.

Because of the food value in these flour mill waste solids, prior attempts have been made to recover these products as an animal nutrient or feed. The attempts have been fruitless because the recovery could not be accomplished economically and, while the wastes are high in protein and fat, the recovered products had a very low protein and fat content and therefore had little utility as a nutrient.

It is only economically feasible to carry the flour mill waste solids from the centrifugal separator by means of a water stream. Thus, the wastes to be recovered must be separated from a rather large amount of water, and the water separation can occur practicably only in a thickener such as a centrifuge or clarifier or settling tank of some type. However, wheat is rich in both starch and gluten, and the gluten as is well known is a proteid or sticky albumin. Upon sitting for prolonged periods, the proteids or proteins and starches are dissipated from the wheat by what is believed to be a leaching action, and appear in the water as a thick gelatin or pasty mass. When this occurs and the wastes are introduced into a clarifier, the thick paste or gelatin clogs the filters and pumps, and generally impedes the settling action of the clarifier. It is, therefore, virtually impossible to separate the fluids from the solids in the clarifier, and certainly any separation that occurs is not efficient and therefore not economical. Further, since the fats and proteins have been dissipated from the wheat solids, the recovered products are therefore of practically no value as a nutrient and are not advantageously usable as an animal feed. I have discovered a practical process for recovering flour mill waste solids wherein a valuable feed is obtained economically.

Further, since water is used in large quantities in the washing process, water costs are quite high and anything to conserve water is desirable, if the cost of the conservation procedure is not greater than the water cost savings that will result. When the mill waste solids are separated from the grain products in the washing operation, the water content of the wastes is about 60% to 75%. I have discovered that in wastes recovery process, the water may be recovered economically and I provide an inexpensive process for its recovery.

An object of the invention is to recover a nutrient from flour mill wastes that is valuable as a feed. Another object of the invention is to provide an economically practicable process for treating flour mill wastes to recover a dry feed therefrom having a relatively high fat and protein content and an attractively low ash content. Still another object is in providing a process for recovering the waste water at the time the mill waste solids are recovered.

A further object of the invention is to provide a process for recovering a valuable dry nutrient from wheat wash water wastes of flour mills, and for recovering the water itself and that involves only a minimum capital expenditure for recovery equipment. Still a further object of the invention is to utilize a thickener in a process for recovering flour mill wastes, and wherein the process is such that the formation of paste-like gelatin-like masses is obviated so that clogging of the filters and pumps, etc., of the equipment used is avoided.

Yet a further object is that of providing an improved process of the character described, wherein the amount of reclaimed solids is increased by the inclusion of colloidals therein; wherein an effluent of sufficient clarity is recovered from the clarifier so as to permit its reuse when blended with raw water, or if it is further filtered to reduce the water volume required for back-flushing such filters; and to reduce the time required for the separation of the waste solids from the wash water. Additional objects and advantages of the invention will appear as the specification develops.

Embodiments of the invention are illustrated in the accompanying drawings in which—

FIGURE 2 is a partial flow diagram illustrating a modification in the equipment;

FIGURE 3 is a partial flow diagram illustrating a modification in the equipment at another stage in the process; and FIGURE 4 is a partial flow diagram illustrating a modification in the equipment at still another stage.

Figure 1:
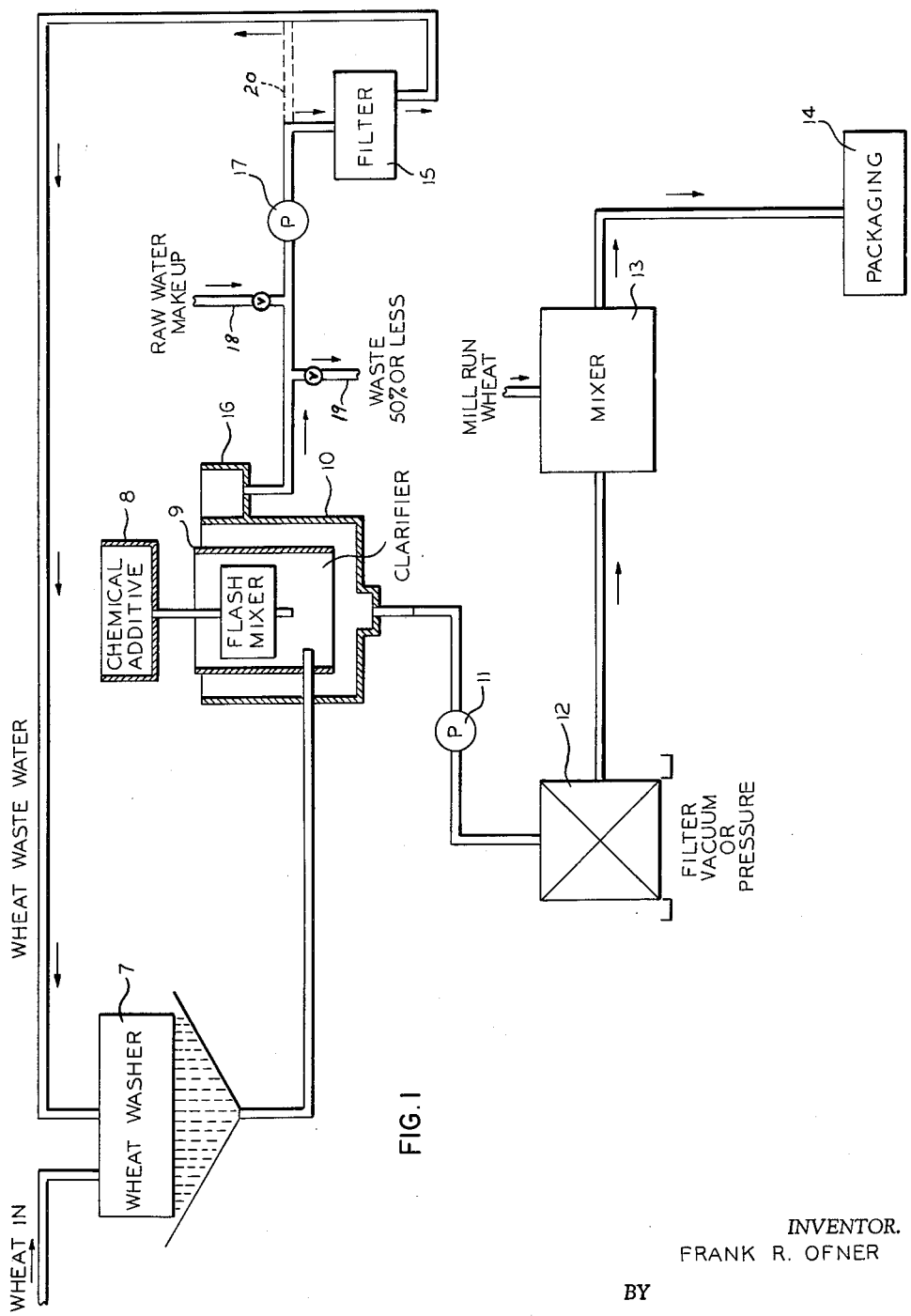
FIGURE 1 is a flow sheet illustrating the steps in the process and indicating in general the equipment that may be used therefor.

The starting material is flour mill wastes comprising essentially water and wheat solids including cracked, broken and whole wheat. In the past, this starting material has been normally disposed of as valueless though it contains a relatively high concentration of wheat solids. For example, in even very small flour mills using water for the washing of the wheat grain, the waste solids amount to about a ton per day.

As explained in the aforesaid patent applications, I have discovered that if the recovery of the flour mill wastes is started within about 16 hours and up to 24 hours from the time of formation thereof, the dissipation of the proteins and fats of the wheat solids into the waste water is not sufficient to render the recovered material valueless as an animal nutrient. If the recovery process is started within about this time, the formation of a paste-like mass within the wastes has not progressed to such an extent that it is almost impossible to utilize a clarifier or centrifuge, etc., in thickening the flour mill waste solids as a step in the recovery thereof. Therefore, within about 16 hours after the time the wheat wash water wastes are formed, I utilize a means for thickening the waste solids. The thickening may be accomplished by introducing the wastes into a centrifuge, clarifier, settling tank, or some other thickener that has been designated with the numeral 10 in the drawing.

The wastes are processed in the thickener 10 until the waste solids have thickened to the desired consistency. If a clarifier is used, the waste solids are retained in the clarifier for about 10 to 30 minutes, and it is found that the thickening or concentration of the solids will reach a proper consistency in about this range of time. The thickened material is pumped through a sludge pump 11 to a filter 12. The filter 12 is operative to further reduce the water content of the solids, and any suitable apparatus for accomplishing this result may be used. For example, the filter 12 may be a vacuum-type filter or a pressure filter, or if desired any one of a number of extrusion type presses may be employed, and will perform the same operation of further reducing the moisture content of the waste solids. Generally, the vacuum-type filter is more efficient than extrusion type presses, and will be used for this reason.

Any type of pump 11 may be used to transfer the thickened solids from the thickener 10 to the filter 12. In certain installations, it may be desirable to eliminate the pump 11 completely, and to depend upon a gravity feed from the thickener 10 to the filter 12. A gravity feed is illustrated in FIGURE 2 of the drawings as an alternative structure, and the numeral 11a has been applied to the gravity feed for purposes of accurate identification.

In the event that the flour mill wastes are permitted to stand for a considerable period of time prior to being fed into the thickener 10, then it will be advantageous to remove the thickened solids from the thickener 10 immediately after the thickening thereof and to introduce the solids into the filter 12. If, on the other hand, the flour mill wastes are immediately introduced into the thickener 10 upon their formation, the waste solids may be allowed to stand in the thickener for a substantial period without danger of excessive protein and fat dissipation and before excessive formation of the undesirable gelatinous or paste-like masses occurs.

In the filter 12, the moisture content of the thickened waste solids is further reduced to about 65% (which is fairly dry to the touch). The excess water is drawn off from the filter, and the relatively dry products are then transferred to a mixer 13. At the same time, a dry material is fed into the mixer 13 and is there mixed with the partially dry waste solids. In the mixer 13, the moisture content of the waste solids is reduced from about 65% to a value normally within the range of about 12% to 18%. Any desired dry products may be introduced into the mixer 13, and preferably mill run wheat is added to the mixer and is mixed therein with the waste solids. It should be understood, however, that other dry material such as other feeds or grains, etc., may be used and mixed with the waste solids in the mixer 13.

Alternatively, a drier shown in FIGURE 3 and designated with the numeral 13a may be employed to dry the solids after they have been taken from the filter 12. Any type of drier 13a may be employed, and I have found that a rotary type kiln is satisfactory. In the drier, the moisture content of the waste solids is reduced from about 65% to within the range of about 10% to 18%.

From the mixer 13 or drier 13a, the dry solids are introduced into a suitable packaging unit 14 where they are packed as a dry nutrient immediately usable and saleable as a dry feed having a relatively high fat and protein content and a relatively low ash content. The material is taken from the drier 13a in a dry cake form, and if desired the cakes may be crushed or broken prior to packaging.

It is also desirable to recover as much of the flour mill waste water as is economically feasible, since if such water can be recycled or reused in further grain washing operations, it will reduce materially the water costs of the flour mill. Normally, such water as forms a part of the flour mill wastes is lost, in that the recovery thereof has not been practicable. I have found that in the thickener 10 where the waste solids are concentrated, the water separated therefrom and withdrawn or otherwise expelled from the thickener, such water is in a state of low contamination. This low contaminant water effluent may be readily filtered in a filter 15. The filter 15 removes substantially all of the contaminant from the water effluent, and the remaining water may be recirculated and used in a further wheat washing operation. The filter 15 may be of any suitable type, and may be either a pressure filter or an open type filter such as sand and rock. The filter 15 is simply representative of a number of devices that may be employed for removing the contaminant from the water effluent. The water may be drawn from the overflow 16 of the clarifier by a pump 17, for delivery to the filter.

It is apparent that the apparatus described is conventional, and that the particular apparatus employed may be varied considerably and may be chosen to meet the economic needs and other needs of any particular installation. In this respect, as is well known, each concentrator will have a theoretical detention time depending upon the size thereof and the rate of flow thereinto. For example, if the concentrator has a capacity of 5,000 gallons, there is a theoretical time for which each drop of liquid added to the concentrator will circulate completely therethrough and be withdrawn therefrom; and such time, as stated, will be influenced by the flow rate of material thereinto. It will be apparent that in most commercial applications, the withdrawal of the water effluent will be continuous—that is, wastes will be continuously added to the concentrator and the water effluent will be continuously withdrawn therefrom to make room for the added material.

I have now discovered that the yield of solids reclaimed by means of the foregoing process can be materially increased without detrimentally congealing the wastes, causing a dissipation of the fats and proteins therein, or causing the starch and gluten to form a thick gelatin or pasty mass, by blending a floccing agent with the wastes at the time of or prior to the introduction thereof into the clarifier. Apparently, the floccing agent causes the colloidals in the wastes to be added to the solids that are thickened therefrom in the clarifier, and it has been found that the recovery of the solids will be increased upwardly of ½% depending upon the type of wheat being washed, the weather conditions during the growing season and harvest, and the locality in which the wheat was grown. Further, the floccing agent hastens the thickening of the recoverable materials in the clarifier, and thereby materially reduces the retention time thereof. Such an arrangement is illustrated in the drawing.

The floccing agent, which may be alum or comparable material, can be introduced into the wastes while they are being fed into the clarifier 10, as from the exemplary tank 8 which is shown. In such event, a mixer 9 will be included so as to thoroughly blend the floccing agent with the wastes. Clarifiers containing flash mixers as an integral part thereof are available commercially. Alternatively, the chemical additive may be introduced into the wastes at any convenient point between the washer 7 and clarifier, as exemplified by the position of the chemical additive container 8a and flash mixer 9a shown in FIGURE 4 of the drawings.

Furthermore, this procedure provides a water effluent from the clarifier that may be reused without filtering the same, simply by blending raw water therewith in a proportion of about 50% or more depending upon the degree of clarity required by the individual mills. The unused portion of the effluent may ordinarily be discharged to the disposal facilities. This will enable the miller to realize a reduction in his water costs, where the additional savings he would realize by filtering the effluent and reusing all of it is not warranted by the expenditure required for the necessary filters, etc. The make-up water may be introduced into the system through the valve-controlled conduit 18, and the waste water may be discharged through the valve-controlled conduit 19. In such event, the filter 15 will be by-passed, as through the conduit 20 shown by broken lines.

However, where substantially all of the water effluent is recovered for reuse by filtering the same, it is found that there is an additional water savings realized by the miller by introducing the floccing agent into the flour mill wastes—for he is then required to use less water in flushing the filters because there is a substantial reduction in the load thereon when a major portion of the colloidals are removed from the effluent in the clarifier 10. Ordinarily, it will be desirable to add soda ash or other base salt material to the water effluent before reusing the same in subsequent washing operations. Also, chlorine may be added, if desired. As stated before, various floccing agents may be used, and an example of one specific composition is 20 pounds of alum, two gallons of sulphuric acid (commercial grade), and 40 gallons of water. Since the flour mill wastes are ordinarily provided continuously by the wheat washers, such material will be continuously fed into the clarifier 10, and in such event the chemical additive will be continuously blended into the wastes, and the specific rate will depend upon the volume of the flour mill wastes.

It has been found that the dry nutrient obtained has a relatively high fat and protein content, while the ash content is attractively low. The dried product is immediately saleable and usable as an animal feed. The thickening action in the clarifier occurs quite rapidly, and it has been found that substantially all of the solids including the colloidal materials are recovered within less than 10 minutes after their introduction into the clarifier. Further, there is negligible gelatin formation, and therefore the clarifying process is not impeded, nor are the filters, pumps, etc. clogged.

While in the foregoing specification I have set forth a description of the invention in considerable detail for purposes of illustration, it will be apparent to those skilled in the art that numerous changes may be made in such details without departing from the principles and spirit of the invention.

I claim:

1. In a process for treating flour mill wastes which consist substantially of wheat solids and wash water to recover both the wash water and a relatively dry nutrient, the steps of mixing a floccing agent with said wastes at the normal temperature thereof and thereafter thickening the same at such temperature within 24 hours after their formation to concentrate the solids and produce also a relatively low contaminant water effluent, filtering the thickened material within about 20 minutes following the initiation of the thickening thereof to further reduce the moisture content of the thickened material, drying the filtered material to produce a relatively dry feed nutrient, dividing into separate components the water effluent remaining after said thickening of the wastes, one such component being more than about 50% of the effluent, and adding raw make-up water to said one component to enable the same to be reused in subsequent washing operations.

2. The process of claim 1 in which said floccing agent is alum.

References Cited in the file of this patent

UNITED STATES PATENTS

| | | |
|---|---|---|
| 979,482 | Hardman | Dec. 27, 1910 |
| 2,114,576 | Schinman | Apr. 19, 1938 |
| 2,261,924 | Pittman et al. | Nov. 4, 1941 |
| 2,263,608 | Brown | Nov. 25, 1941 |
| 2,300,693 | Oswald | Nov. 3, 1942 |
| 2,609,328 | Reed | Sept. 2, 1952 |
| 2,835,984 | Ofner | May 27, 1958 |
| 2,835,985 | Ofner | May 27, 1958 |